United States Patent Office 3,318,944
Patented May 9, 1967

3,318,944
ISOCITROMONONITRILE ESTERS AND ACIDS
Richard H. Wiley, Louisville, Ky.
(30 Beeckman Place, New York, N.Y. 10022)
No Drawing. Filed Oct. 24, 1962, Ser. No. 232,871
9 Claims. (Cl. 260—465)

This invention describes a chemical process for the manufacture of isocitric acid and related compounds, and the use of the isocitric acid and derivatives as chemical intermediates and as new and improved plasticizers.

Isocitric acid has been known for many years. Its importance as a biochemical intermediate in the tricarboxylic acid (Krebs or citric acid) cycle is well established and its widespread distribution in natural products has been repeatedly demonstrated. It is a chemical which is of great potential practical value due to its non-toxicity in various food, pharmaceutical and plastic products. Up until now, however, no economically useful synthesis of isocitric acid or any material from which it can be made has been described or devised.

It is the purpose of this invention to describe an economically practical and valuable method for the manufacture of isocitric acid and certain hithertofore unknown related compounds, and ways in which these materials are of particular use.

According to my invention, an α-formyl succinic acid ester, which is obtainable by synthesis from readily available petro-chemicals, is reacted with HCN to form the isocitromononitrile ester which is then hydrolyzed to isocitric acid. The reaction with hydrogen cyanide may be carried out batch-wise or continuously, with a solvent system or without. Hydrogen cyanide may be introduced as a gas or may be formed more conveniently in situ by the reaction of a suitable salt of hydrogen cyanide, with acid. Other suitable hydrogen cyanide sources may be used as well. The reaction is performed conveniently in the temperature range of −20° C. to 80° C. and in a preferred temperature range of 0° C. to 5° C. Temperatures below ambient temperatures may be maintained by the use of non-aqueous coolants such as ice or mechanical refrigeration. The reaction proceeds fairly rapidly and can have a duration of 0.5 hour to 10 hours with the preferred duration being 1 to 3 hours. These reaction times can be accomplished on a continuous basis by such techniques as staging or recycling.

The product is recovered from the reaction mixture by extraction with solvents such as diethyl ether, ligroin, benzene, tetrahydrofuran or ethyl acetate. The extract may be washed with water and with dilute alkali to remove unreacted starting material, and dried over an anhydrous salt or by distillation with benzene. The product is finally recovered from the extract or residue by distilling or evaporating the extractant. The product is thereby obtained in good yield and purity.

The preferred α-formyl succinic acid ester starting material is, in general, a neutral diester having the formula:

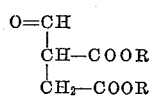

wherein R is alkyl ($C_1$ to $C_{22}$), cycloalkyl ($C_3$ to $C_{12}$) or aryl ($C_6$ to $C_{20}$). Examples of R groups are methyl, ethyl, propyl, butyl, 2-ethylhexyl, octadecyl, cyclopentyl, cyclohexyl, phenyl and benzyl. The esters employed may be mixed esters, having two different R groups in the molecule.

The isocitromononitriles of my invention may be hydrolyzed by acid or base catalyzed reaction to form isocitric acid. In a preferred embodiment of my invention the isocitromononitrile is heated at about 15° to 25° C. with 1.0 N hydrochloric acid for several hours. The isocitric acid is recovered by diluting the reaction product with water, extracting with a solvent such as diethyl ether and then evaporation of the solvent.

The isocitromononitrile may be alcoholyzed by acid or base catalyzed reactions with alcohol.

Partial hydrolysis of the cyano group of the isocitromononitrile to the acid amide takes place by adding the crude reaction product to concentrated sulfuric acid at room temperature.

The cyano group of an isocitromononitrile diester can be selectively hydrolyzed to the carboxyl group without disturbing the ester functions present by adding the isocitromononitrile dialkyl ester to cold, concentrated sulfuric acid and then heating to about 80° C. for a few minutes.

Lactone formation takes place on dehydration of isocitric acid. Isocitric acid lactone can be obtained by evaporating an aqueous solution of isocitric acid and then extracting the residue with ethyl acetate or other solvent. Isocitric acid lactone is also obtainable by evaporating an aqueous citric acid solution at 100° C. under vacuum until the residual lactone solidifies. It is purified by recrystallization from ethanol and toluene. In a similar manner an isocitric acid ester is converted into the corresponding lactone.

The isocitric acid esters of my invention are readily converted into their O-acyl derivatives by reaction with acid chlorides or acid anhydrides. The O-acetyl derivatives are prepared by reaction with acetic anhydride or with ketene. Among the various possible acyl derivatives, acetyl, butyryl, isobutyryl, stearoyl, benzoyl, and terephthaloyl are of particular interest in providing structural variants suitable for use with differing polymers as plasticizers. Thus, the O-acetyl derivatives are useful with cellulose acetate and the O-butyryl derivatives are useful with polyvinyl chloride.

These O-acetyl derivatievs lose acetic acid on heating to form the corresponding unsaturated nitriles, the aconitic acid nitriles.

The isocitromononitriles of this invention are useful intermediates for the manufacture of aconitic compounds. These are formed by strong acid catalyzed dehydration of the isocitric acid mononitrile or its ester, or by the pyrolysis of the O-acetyl derivative of the isocitric acid mononitrile. The strong acid catalyzed reaction may be achieved in solution with concentrated sulfuric or phosphoric acid or in the vapor phase over alumina-silica catalysts at elevated temperatures. The O-acetate derivatives are dehydroacetylated in the vapor phase at elevated temperatures over similar catalysts. The products in either reaction are diesters of aconitic acid mononitriles having the formula $NCCH=C(CO_2R)—CH_2CO_2R$ wherein R has the meaning above defined. They are useful as plasticizers especially for polyacrylonitrile polymers and copolymers; they are useful as monomers and comonomers in polymerization to low molecular weight materials which have utility as plasticizers, or for polymerization to high molecular weight polymers. As comonomers they impart dyeability to acrylonitrile copolymers without loss of other desirable fibre properties. They can be partially hydrolzed to aconitic acid monoamides of the formula $H_2N—CO—CH=C(CO_2R)CH_2CO_2R$, wherein R has the meaning above defined. These have similar desirable properties. As comonomers they impart dyeability and antistatic properties to acrylonitrile copolymer fibers.

The above described transformations are shown in the following diagram:

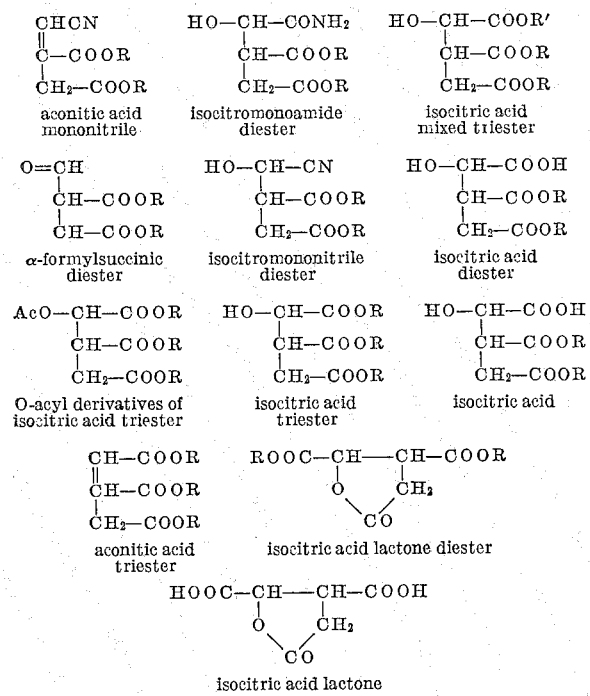

wherein R is alkyl, cycloalkyl or aryl.

It is an advantage of my invention that it affords a method for making isocitric acid which is economical and practical, and also permits the synthesis of a large variety of entirely new compounds which were unobtainable by prior art methods. For example, my process affords the only practical method for preparing diesters and mixed triesters of isocitric acid, and the O-acyl derivatives thereof, which compounds can be tailored to meet special needs in the plastic industry.

When used as plasticizers the isocitric acid products have greatly improved resistance the loss of water and increased thermal stability as compared to the corresponding citric acid products. Without being restricted to any theory of action, it will be observed that in the citric acid molecule the carbons adjacent to the carbon having the OH group have four hydrogen atoms, whereas in the isocitric acid molecule there is only one hydrogen atom on a carbon adjacent to the carbon having the OH group,

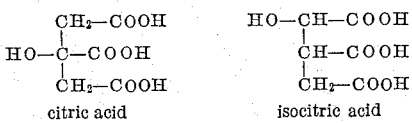

There are thus four hydrogen atoms available in the citric acid molecule as compared with two in the isocitric acid molecule for dehydration. Thus removal of the OH with an H is made more likely in the citric acid products with consequent increased instability. Analysis of the conformational stereochemistry also establishes an increased stability of the isocitric acid products toward dehydration. It is also to be noted that the hydroxyl of citric acid is tertiary and the hydroxyl of ioscitric acid is secondary. It is known that tertiary hydroxyl compounds are much more easily dehydrated than are secondary hydroxyl compounds.

Stereoisomerism occurs in the products of my invention. Isocitric acid, for example, is known to exist in four stereochemical forms consisting of two DL pairs. Also, both cis-trans isomers of aconitic acid are known. It is an advantage of my invention that mixtures of the stereoisomers are formed. These mixtures of isomers produce superior plasticization at lower concentrations than would result from the use of a stereoisomerically pure compound. The isocitrates are thus better plasticizers than the citrates which are pure compounds with no asymmetric carbons.

Many commercial resins, plastics and rubbery materials require substantially permanent plasticization. This is accomplished by adding monomeric compounds that are compatible with the resin or plastic and that make the manufactured article more pliable, less brittle and, in many instances, stronger and tougher. In applications such as surface coatings, for example, retention of film pliability and physical properties is very important. When used in films for food wrappings it is required that the plasticizer be non-toxic. It is a particular advantage of my invention that the isocitric acid esters are non-toxic.

The following are typical examples of polymers to which these compounds may be added: polyacrylonitrile and its copolymers, polyvinyl chloride and its copolymers, polyvinylidene chloride and its copolymers, polyvinyl fluoride, polyvinyl acetate and its copoylmers, polyvinylidene cyanide and its copolymers, cellulose acetate, cellulose propionate, cellulose butyrate, cellulose esters and mixed esters, cellulose ethers, polyamides, polyesters, and the like.

As compared to the corresponding citrates, the isocitrates give uniformly lower brittle temperatures (by (10–30°) and lower volatile loss (by a factor of 2–5) while maintaining equivalent or better plasticization in other respects.

The following are examples that serve to illustrate but do not limit my invention.

*Example 1*

Diethyl α-formylsuccinate, 20.2 g. (0.1 mole) and 5.0 g. of powdered sodium cyanide are stirred in an ice-cooled flask while 6 ml. of 30% aqueous sulfuric acid is added. The temperature is held at 0–5° C. over a period of about two hours and then the reaction product is extracted with diethyl ether. Upon removal of the ether by evaporation, substantially pure product, namely isocitronitrile diethyl ester, is obtained in a yield of 85% by weight. Theor.: N, 6.1%; analysis: 6.3%. Reaction with acetic anhydride gives the acetyl derivative, M.P. 50–5° C.

*Example 2*

Following the procedure of Example 1, but starting with the dimethyl ester of α-formylsuccinic acid, there is obtained α-(1,2-dicarbmethoxyethyl)glycolonitrile (isocitronitrile dimethyl ester) in a yield of about 80% by weight. Theor.: N, 6.6%; analysis: 6.8%

*Example 3*

Following the procedure of Example 1, di(2-ethylhexyl) formylsuccinate is used in the preparation of α-(1,2-dicarb-2-ethylhexoxyethyl)glycolonitrile (isocitronitrile di-(2-ethylhexyl) ester in a yield of 87% by weight. Theor.: N, 3.7%; analysis: 4.2%. In a similar manner, the dioctadecyl ester of isocitronitrile is prepared in good yield and in high purity. It is convertible to O-acetyl derivatives by reaction with acetic anhydride.

*Example 4*

Dimethyl α-formylsuccinate, 120 g, (0.33) mole is suspended in 60 cc. of diethyl ether and 100 ml. of water. The mixture is stirred and 82 g. of pulverized sodium cyanide is added. When the sodium cyanide has dissolved, the temperature of the reaction mixture is lowered to 5° C., at which point 140 cc. of concentrated hydrochloric acid is added at such a rate that the temperature is maintained between 5–10° C. When the addition is completed, the reaction mixture is stirred at room temperature for about two hours. The liquid portion is separated into an aqueous fraction and an ether fraction. The aqueous layer is shaken with additional ether portions and all ether extracts are combined and dried. Upon removing the ether by distillation, a residue of substantially pure isocitronitrile dimethyl ester is obtained in a yield of 72% by weight. Theor.: N, 6.6%; analysis: 6.8%.

*Example 5*

Diethyl α-formylsuccinate (200 g.) is converted to the isocitromononitrile diethyl esters by the addition of 30 g. of hydrogen cyanide in the presence of 1.0 g. of sodium cyanide. This crude reaction mix is added slowly, with cooling, to 60 ml. of concentrated sulfuric acid. After heating to about 150° C. for about 15 minutes and then cooling, the mix is poured into 300 ml. of cold water. Neutralization with sodium carbonate causes the α-mono amide of diethyl isocitrate (M.P. 110–120° C.) to precipitate. In a similar manner the diphenyl ester of isocitromononitrile (M.P. 83–85° C.) is obtained which is then similarly hydrolyzed to the corresponding monoamide.

*Example 6*

Isocitromononitrile diethyl ester (20 g.) prepared as described in Example 1 is heated at 15 to 25° C. with 50 ml. of 1.0 N hydrochloric acid for 6 hours, and then diluted with 50 ml. of water. The product is extracted with diethyl ether. Upon removal of the ether by evaporation, 16.5 g. of isocitric acid is obtained which melts with partial conversion to isocitric acid lactone at 100° C.

Esterification of the isocitric acid by reaction with ethanol in the presence of acid catalyst gives the isocitric acid triethyl ester, B.P. 175°/10 mm.; reaction with diazomethane gives the trimethyl ester, B.P. 160°/9 mm., M.P. 85–94° C. The triethyl ester is converted into the O-acetyl thiethyl icocitrate by reacting 10 g. of the ester with 4 g. of acetic anhydride.

*Example 7*

Isocitromononitrile diethyl ester (20 g.) prepared as described in Example 1 is refluxed with 50 ml. of 1.0 N hydrochloric acid for 6 hours, cooled, and extracted with ether in a continous extractor. Evaporation of the ether extracts affords 15 g. of isocitric acid lactone, M.P. 135–155° C. Fractional recrystallization from ethyl acetate gives the two pairs of DL isomers, M.P. 154° C. and M.P. 161° C.

Isocitromononitrile dimethyl ester (120 g.) prepared as described in Example 2 is saturated with hydrogen chloride and allowed to stand for 10 hours. Excess hydrogen chloride is removed by aeration. The residue is neutralized by adding 150 g. of 50% sodium hydroxide solution while cooling. Solid sodium hydroxide is added and the mixture is steam distilled to remove ammonia and unreacted starting material. The solution is cooled, treated with charcoal, extracted with ether, and evaporated to dryness. The dry residue is extracted with hot ethyl acetate from which on concentration and addition of chloroform is obtained 96 g. (80% yield) of isocitric acid lactone, M. P. 159–161° C.

Addition of methanol to the crude extracts of the lactone, refluxing, and fractionation affords the dimethyl ester of the lactone, B.P. 170–180°/15 mm., M.P. 101–4° C. With other alcohols (ethyl, 2-ethylhexyl, octadecyl) the corresponding dialkyl esters of isocitrolactone are obtained. These are also prepared by ester interchange with the alcohol and dimethyl or diethyl isocitric lactone.

*Example 8*

Isocitromononitrile diethyl ester (17 g.), prepared as in Example 1, is treated with 2-ethylhexyl alcohol (50 g.) and 5-ml. of concentrated hydrochloric acid. The mixture is refluxed for about 3 hours while the ethyl alcohol is continuously distilled off. The reaction product is washed with water and then with dilute alkali to remove the acid catalyst; it is then dried to give the tri(2-ethylhexyl)isocitrate, B.P. 225°/1 mm.

The O-acetate derivative of the tri(2-ethylhexyl)isocitrate is prepared by contacting about 10 g. of the ester with an excess of ketone for about one hour at 50° C.

In accordance with the above procedures, but using an equivalent quantity of octanol-2, octadecyl alcohol, decyl alcohol, or lauryl alcohol in place of 2-ethylhexyl alcohol, the corresponding tri(2-octanyl), trioctadecyl, tridecyl or trilaurylisocitrate esters are obtained.

*Example 9*

Isocitromononitrile diethyl ester (25 g.), prepared as in Example 1, is refluxed with 100 ml. of n-butyl alcohol containing 5 ml. of 6 N hydrochloric acid for 10 hours with continuous removal of the ethanol formed in the interchange. The reaction mixture is washed with water and then with dilute alkali to remove the acid. The product is then fractioned to remove the excess butanol. The residue is nearly pure tributyl isocitrate. The pure ester, 25 g., B.P. 175°/1 mm. is obtained by fractional distillation. Analysis: 59.9% carbon; 8.9% hydrogen. Similar products are obtained using isobutyl alcohol or n-propyl alcohol.

The tributyl ester is converted into the O-acetyl tributyl ester B.P. 185°/1 mm. (analysis: 59.8% carbon; 8.5% hydrogen) by reacting 40 g. of the ester with 15 g. of acetic anhydride at 50° C. When other acid anhydrides are used in place of acetic anhydride the corresponding O-acyl derivatives are obtained.

*Example 10*

Tributyl isocitric acid, or the O-acetyl derivate thereof, dissolved in acetone with either polyvinyl chloride-acetate or cellulose acetate in an amount equal to 10–50% of the ester, or with cellulose acetate-butyrate in an amount equal to 10–60% of the ester, gives a clear solution from which pliable films are obtained on evaporation.

When the tributyl isocitric acid, or O-acetyl derivative thereof, is milled with any of the above named plastics, plasticized materials are obtained containing 10–50% of the ester.

Similar results are obtained with soluble polyacrylonitrile type polymers, polyvinylidene chloride of styrene-butadieneacrylonitrile copolymers.

Similar products result when tri-isobutyl esters or tri-propyl esters are used in place of tributyl esters. The tri(2-ethylhexyl), tridecyl, trioctadecyl, or trilauryl or tri(2-octanyl)isocitrate esters give similar products, with added low temperature flexibility. Films from solutions of the octyl esters in acetone with polyvinyl chloride-acetate or cellulose acetate are remarkably pliable.

*Example 11*

The isocitronitrile diethyl ester of Example 1 (10 g.) is dissolved in cold concentrated sulfuric acid (10 ml.) and heated to 60° C. for 15 minutes. The solution is cooled and diluted, with cooling, to keep the temperature at 15–20° C. The oil which separates is collected and dried to give 8 g. of the diethyl ester of isocitric acid. By using other isocitromononitrile diesters, the corresponding isocitric acid diesters are obtained. These are characterized by conversion to their triesters prepared as described in other examples and to their lactone diesters. In place of concentrated sulfuric acid, 85–95% phosphoric acid is used to give the same products.

*Example 12*

The isocitronitrile diethyl ester of Example 1 (10 g.) is treated with ketene at room temperature over a one hour period to yield the O-acetyl derivative. This product is heated to about 350° C. to eliminate acetic acid and yields the diethyl ester of the α-mononitrile of aconitic acid; B.P. 125°/1 mm. Theor.: N, 6.1%; analysis: N, 6.0%. Direct dehydration by heating the free hydroxy compounds (instead of the O-acetyl compounds) in pyridine with catalytic amounts of p-toluenesulfonic acid or phosphorus oxychloride gives the same products. The diisobutyl, diphenyl, diisooctyl, and dioctadecyl esters of the α-mononitrile of aconitic acid are also prepared in this manner.

These aconitromononitrile esters can be mixed with styrenebutadiene-acrylonitrile copolymers, vinyl chloride copolymers, cellulose esters and polymethacrylates, in solution or in the solid phase as described in Example 10, to give plasticized sheets, films, and molded articles. The esters are especially compatible with and give particularly pliable materials with acrylonitrile copolymers.

Various changes and modifications may be made in carrying out the present invention without departing from the scope thereof. Insofar as these changes and modifications are within the purview of the annexed claims, they are to be considered as part of my invention.

I claim:

1. A compound having the formula

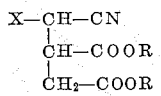

wherein R is hydrogen, an alkyl radical having from 1 to 22 carbon atoms, cycloalkyl having from 3 to 6 carbon atoms, phenyl, or phenalkyl where the alkyl group has from 1 to 2 carbon atoms; and X is hydroxyl or an alkanoyloxy radical having from 1 to 18 carbon atoms.

2. O-acetyl-isocitromononitrile diethyl ester having the formula

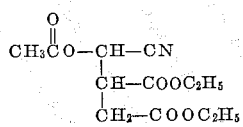

3. A compound having the formula

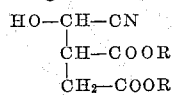

wherein R is hydrogen, an alkyl radical having from 1 to 22 carbon atoms, cycloalkyl having from 3 to 6 carbon atoms, phenyl, or phenalkyl where the alkyl group has from 1 to 2 carbon atoms.

4. The mononitrile of isocitric acid having the formula

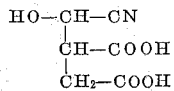

5. The isocitromononitrile dimethyl ester having the formula

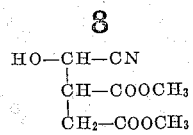

6. The isocitromononitrile diethyl ester having the formula

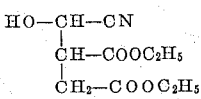

7. The isocitromononitrile di(2-ethylhexyl) ester having the formula

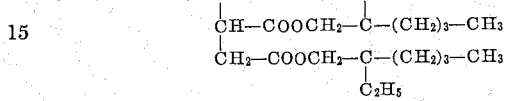

8. The isocitromononitrile diphenyl ester having the formula

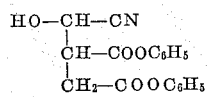

9. A compound having the formula

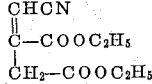

References Cited by the Examiner

UNITED STATES PATENTS

| | | | |
|---|---|---|---|
| 2,333,726 | 11/1943 | Leibitz et al. | 260—535 |
| 2,822,378 | 2/1958 | Bader | 260—479 |
| 2,842,558 | 7/1958 | Wagner | 260—343.6 |
| 2,899,467 | 8/1959 | Brennan et al. | 260—535 |
| 3,003,888 | 10/1961 | Caldwell | 106—181 |
| 3,028,417 | 4/1962 | Eisenmann | 260—484 |
| 3,078,298 | 2/1963 | Gregory et al. | 260—465.4 |
| 3,104,979 | 9/1963 | Lawton et al. | 106—181 |
| 3,133,114 | 5/1964 | Freure | 260—465.4 |
| 3,137,700 | 6/1964 | Johnson | 260—465.4 X |
| 3,173,939 | 3/1965 | Johnson | 260—465.4 |

OTHER REFERENCES

Migrdichian: "The Chemistry of Organic Cyanogen Compounds," 1947, pp. 173–177.

CHARLES B. PARKER, *Primary Examiner.*

M. LIEBMAN, JOSEPH P. BRUST, *Examiners.*

D. J. ARNOLD, *Assistant Examiner.*